US007660134B2

(12) United States Patent
Imai et al.

(10) Patent No.: US 7,660,134 B2
(45) Date of Patent: Feb. 9, 2010

(54) DC-DC CONVERTER AND CONTROL METHOD THEREOF

(75) Inventors: Takakazu Imai, Tokyo (JP); Takeo Gokita, Tokyo (JP)

(73) Assignee: TDK Corporation, Tokyo (JP)

( * ) Notice: Subject to any disclaimer, the term of this patent is extended or adjusted under 35 U.S.C. 154(b) by 426 days.

(21) Appl. No.: 11/586,861

(22) Filed: Oct. 26, 2006

(65) Prior Publication Data
US 2007/0090821 A1 Apr. 26, 2007

(30) Foreign Application Priority Data
Oct. 26, 2005 (JP) ............................. 2005-310868

(51) Int. Cl.
*H02M 3/335* (2006.01)
(52) U.S. Cl. ...................................... 363/17; 363/56.01
(58) Field of Classification Search ................... 363/17, 363/55, 56.01, 56.02, 58, 21.04, 21.1, 21.11, 363/21.18, 56.06
See application file for complete search history.

(56) References Cited
U.S. PATENT DOCUMENTS 5,255,174 A * 10/1993 Murugan ...................... 363/17
5,541,827 A * 7/1996 Allfather ...................... 363/17
6,618,274 B2 * 9/2003 Boylan et al. ................. 363/17
6,650,552 B2 * 11/2003 Takagi et al. .................. 363/17
6,778,410 B2 * 8/2004 Zeng et al. ..................... 363/16

FOREIGN PATENT DOCUMENTS

JP 2005-210819 8/2005

* cited by examiner

*Primary Examiner*—Bao Q Vu
*Assistant Examiner*—Nguyen Tran
(74) *Attorney, Agent, or Firm*—Howard & Howard Attorneys PLLC (57) ABSTRACT

A DC-DC converter has a switching circuit including switching elements at the high-side and at the low-side, an inductor connected to the output end of the switching circuit, a smoothing capacitor connected to the inductor, a switching control circuit for supplying a switching pulse to the switching elements, and a circuit. The circuit detects that a state that the switching element at the high side is switched off and the switching element at the low side is switched on is maintained for a predetermined period or longer. In this case, the circuit forcibly switches off the switching element at the low side.

3 Claims, 7 Drawing Sheets

DC-DC CONVERTER AND CONTROL METHOD THEREOF

BACKGROUND OF THE INVENTION

1. Field of the Invention

The present invention relates to a DC-DC converter and a control method thereof. Particularly, the present invention relates to a DC-DC converter which produces no backward current, which flows from a smoothing circuit to a synchronous rectifying circuit, when the load becomes light, and a control method thereof.

2. Description of the Related Art

In a DC-DC converter, a switching circuit is switched on and off in response to a pulse signal, to intermittently supply a DC voltage to an inductance element. In some cases, such a DC-DC converter adopts a synchronous rectifying method of supplying a returning current, which flows into the inductance element while no electricity is supplied thereto, to the load through the switching element.

Figure 8:
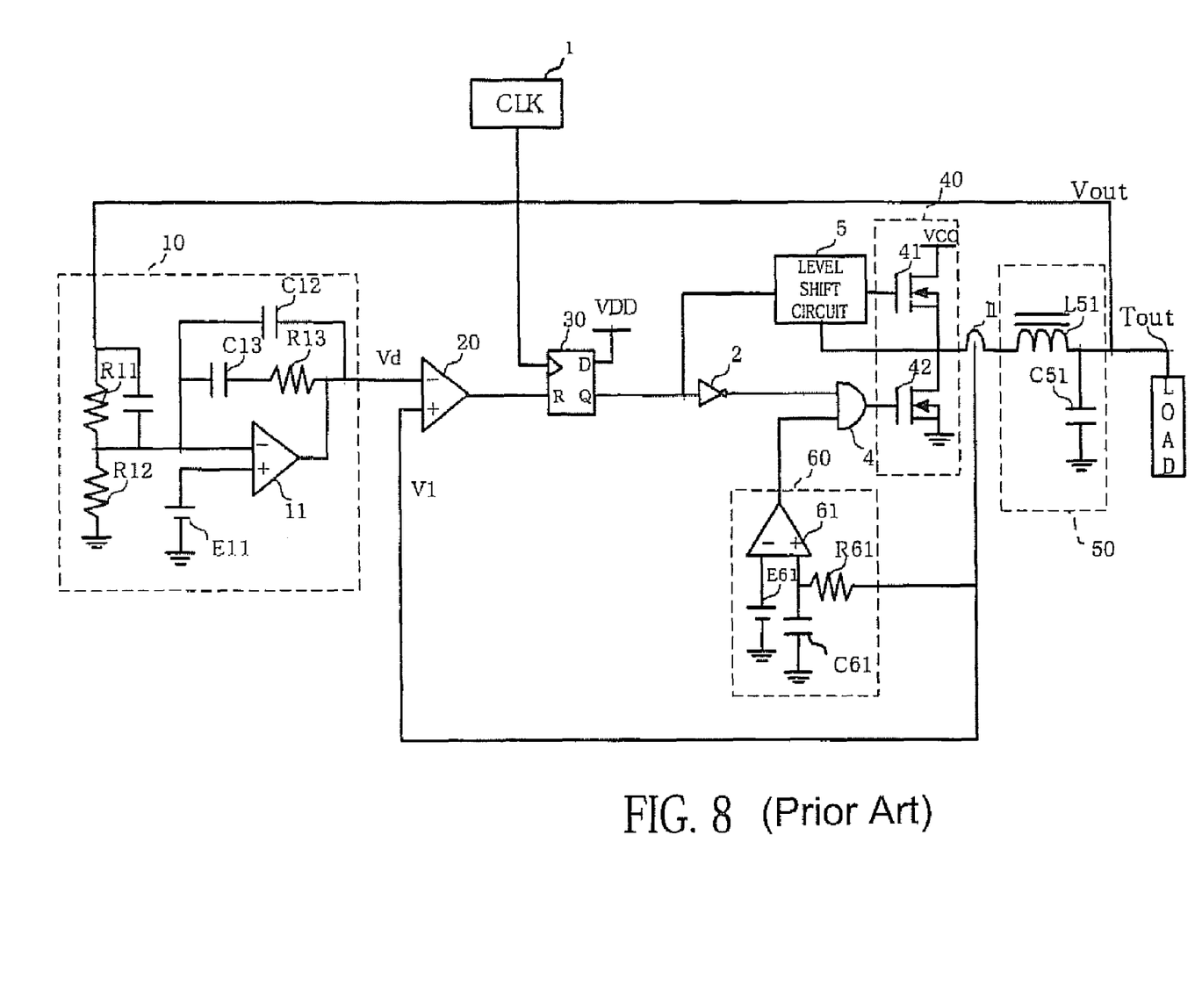
FIG. 8 is a circuit diagram of an assumable DC-DC converter.

FIG. 8 shows one example of circuit structure of an assumable DC (direct current)-DC (direct current) converter of a synchronous rectifying type. This DC-DC converter comprises a light load detecting circuit which switches off a synchronous rectifying switching element, in accordance with whether the load is large or small.

In the DC-DC converter shown in FIG. 8, a control circuit 10 detects the difference between an output voltage Vout from the DC-DC converter and a reference voltage E11, and sends a difference voltage Vd to a comparator 20. The comparator 20 compares the difference voltage Vd with a voltage V1, which corresponds to (for example, is proportional to) the current value of an inductance current (a current flowing from a switching circuit 40 to an inductor L51). The comparator 20 outputs a high level signal in a case where the voltage V1 is higher than the difference Vd, and outputs a low level signal in a case where the voltage V1 is lower than the difference voltage Vd.

A clock signal CLK having a constant frequency is input to a D-type flip flop circuit (hereinafter referred to as D-FF) 30 from a clock circuit 1. The D-FF 30 latches a power source voltage VDD supplied to its data input terminal (hereinafter referred to as D terminal) at a rising edge of the clock signal CLK, and outputs a high level signal from its output terminal (hereinafter referred to as Q terminal). The D-FF 30 is reset by a high level signal from the comparator 20. Thus, the D-FF 30 continues outputting a high level signal from its Q terminal from when the clock signal CLK rises until when the output from the comparator 20 becomes high level.

When the output from the Q terminal of the D-FF 30 becomes high level, a voltage of ON level (high level) is applied, through a level shift circuit 5, to an N-MOSFET (N-channel MOSFET; MOSFET:Metal Oxide Semiconductor Field Effect Transistor) 41, which is at the high side of the switching circuit 40. On the other hand, the logical AND of a voltage of OFF level (low level) having been inverted by an inverter 2 and an output signal from a light load detecting circuit 60 is applied, through an AND circuit 4, to the gate of an N-MOSFET 42 at the low side. Because of this, the N-MOSFET 41 at the high side is switched on, and the N-MOSFET 42 at the low side is switched off. Then, a current flows from a power source VCC into the inductor L51 and charges a smoothing capacitor C51.

When the output signal from the D-FF 30 becomes low level, a voltage of OFF level (low level) is applied to the gate of the N-MOSFET 41 at the high side of the switching circuit 40. On the other hand, a voltage of ON level (high level) inverted by the inverter 2 is applied through the AND circuit 4 to the N-MOSFET 42 at the low side. Therefore, the N-MOSFET 41 at the high side is switched off and the N-MOSFET 42 at the low side is switched on. Then, the current flowing in the inductor L51 flows through the N-MOSFET 42 at the low side.

When the pulse width (high level period) of a pulse output from the Q terminal of the D-FF 30 increases, the ON period of the N-MOSFET 41 at the high side becomes long. Further, the energy to be supplied from the power source VCC to the inductor L51 increases, and the output voltage Vout increases.

When the output voltage Vout increases, the difference voltage Vd obtained by the control circuit 10 decreases and the pulse width of the pulse signal output from the comparator 20 widens. When the pulse width of the pulse signal widens, the period during which the D-FF 30 is reset becomes longer and the pulse width of the pulses output from the Q terminal becomes narrower. Accordingly, the ON period of the N-MOSFET 41 becomes shorter and the energy to be supplied from the power source VCC to the inductor L51 decreases, thereby to reduce the output voltage Vout.

When the output voltage Vout is reduced, the difference voltage Vd obtained by the control circuit 10 increases and the pulse width of the pulse signal output from the comparator 20 becomes narrower. When the pulse width of the pulse signal becomes narrower, the period during which the D-FF 30 is reset becomes shorter and the pulse width of the pulse signal output from the Q terminal becomes wider. Accordingly, the ON period of the N-MOSFET 41 becomes longer. Further, the energy to be supplied from the power source VCC to the inductor L51 increases and the output voltage Vout also increases.

In this way, the output voltage Vout converges at a level at which the system is stable, thereby the output voltage Vout, which is table, is obtained.

In the DC-DC converter shown in FIG. 8, when the load is small, the current that flows in the inductor L51 is small. In order to detect this and stop the synchronous rectifying function, i.e., in order to switch off the N-MOSFET 42, the light load detecting circuit 60 is provided.

When the load is light, the load current decreases and the voltage V1 corresponding to the load current also decreases. Thus, the voltage signal V1 supplied to the positive input terminal (+) of a comparator 61, which constitutes the light load detecting circuit 60, decreases to become smaller than a reference voltage E61. Accordingly, the comparator 61 supplies a low level signal to the AND circuit 4, and the AND circuit 4 controls the N-MOSFET 42 at the low side to be kept off all time. Therefore, only the N-MOSFET 41 at the high side is switched on and off and no returning current flows backward from the inductor L51. Thus, it is possible to prevent a switching loss at the N-MOSFET 42 and save the power to be consumed.

In the DC-DC converter having the above-described structure, when the load changes from a heavy one to a light one, there is a risk that the N-MOSFET 41 at the high side is continuously kept off and the N-MOSFET 42 at the low side is continuously kept on. If this state continues, a backward current flows from the inductor L51 to the N-MOSFET 42. Therefore, the N-MOSFET 42 might be destroyed.

To explain it more specifically, when the load becomes small, the current, which has headed to the load, starts to flow into the smoothing capacitor C51. Therefore, the output voltage Vout increases and the difference voltage Vd output from the control circuit 10 decreases. Accordingly, the output from the comparator 20 is kept at high level continuously and the D-FF 30 continues to be reset. In this state, the Q terminal of the D-FF 30 continuously outputs a low level signal, skipping the outputting of pulse signals, which are to be output otherwise.

Therefore, the N-MOSFET 41 at the high side is kept switched off, and the N-MOSFET 42 at the low side is kept switched on.

Here, if the light load detecting circuit 60 detects the change of the load to a light one and the decrease of the load current I1 (if the comparator 61 outputs a low level signal), the AND circuit 4 outputs a low level signal and the N-MOSFET 42 at the low side is switched off. However, since the time constant of the light load detecting circuit 60 is large (generally, the time constant of the light load detecting circuit 60>>the time constant of the control circuit 10) in order to secure operation stability, the control to switch off the N-MOSFET 42 is delayed. Because of this, the state that the N-MOSFET 41 at the high side is off and the N-MOSFET 42 at the low side is on is maintained. In this state, after the forward current by the electromagnetic energy stored in the inductor L51 ceases to flow, the charges stored in the smoothing capacitor C51 flow backward to the N-MOSFET 42. In the worst case, this backward current destroys the N-MOSFET 42.

As a method of detecting an abnormal state of an output voltage from a power source circuit, a method of sensing a pulse waveform of the output voltage and detecting an abnormal state of the waveform is known. For example, the method is disclosed in Unexamined Japanese Patent Application KOKAI Publication No. 2005-210819.

This method detects the pulse width and pulse interval of the pulse waveform, which appears at the output terminal of the section prior to the smoothing circuit, i.e., the output terminal of the switching circuit, and detects an abnormal state of the power source. After this, the circuit according to this method outputs an abnormal state detection signal representing the detected abnormality.

However, even if an abnormal state of the output voltage from the DC-DC converter of FIG. 8 is detected by the abnormal state detecting method disclosed in the publication, the N-MOSFET 42 at the low side will be controlled after such an abnormal state of the output voltage occurs. Therefore, the abnormal state detecting method disclosed in the publication cannot prevent a backward current.

SUMMARY OF THE INVENTION

The present invention is made in view of the above-described conventional problems. An object of the present invention is to provide a DC-DC converter which produces reduced backward current when the load is light, and a control method thereof.

Another object of the present invention is to provide a DC-DC converter which can be adapted to the changes of the loads, and a control method thereof.

To achieve the above objects, a DC-DC converter according to a first aspect of the present invention comprises:

a first switching element connected between a terminal to which a first potential is applied and a first intermediate terminal;

a second switching element connected between the first intermediate terminal and a terminal to which a second potential is applied;

a first inductance element connected between the first intermediate terminal and an output terminal;

a first capacitor connected between the output terminal and the terminal to which the second potential is applied;

a PWM control circuit which detects a voltage of the output terminal, and outputs a pulse signal having a pulse width determined based on the voltage of the output terminal;

a first driver circuit which drives the first and second switching elements based on the pulse signal; and a first pulse skipping detecting circuit which switches off the second switching element, when detecting that the PWM control circuit has stopped outputting the pulse signal for a predetermined period or longer.

The DC-DC converter may have a first light load detecting circuit which switches off the second switching element, when detecting that a current flowing in the first inductance element becomes equal to or smaller than a predetermined current value. In this case, the first pulse skipping detecting circuit may switch off the second switching element before the first light load detecting circuit switches off the second switching element.

For example, the first pulse skipping detecting circuit detects a period during which outputting of the pulse signal is stopped, by counting a first clock which is synchronous with the pulse signal. Alternatively, the first pulse skipping detecting circuit may detect a period during which outputting of the pulse signal is stopped, by counting a second clock which is asynchronous with the pulse signal.

A DC-DC converter according to a second aspect of the present invention comprises:

a third switching element connected between a terminal to which a third potential is applied and a second intermediate terminal;

a fourth switching element connected between the second intermediate terminal and a terminal to which a fourth potential is applied;

a fifth switching element connected between the terminal to which the third potential is applied and a third intermediate terminal;

a sixth switching element connected between the third intermediate terminal and the terminal to which the fourth potential is applied;

a transformer having a primary winding whose terminals are connected to the second intermediate terminal and the third intermediate terminal respectively;

a seventh switching element connected between a first terminal of a secondary winding of the transformer and a terminal to which a fifth potential is applied;

an eighth switching element connected between a second terminal of the secondary winding of the transformer and the terminal to which the fifth potential is applied;

a second inductance element connected between a tap of the secondary winding of the transformer and an output terminal;

a second capacitor connected between the output terminal and the terminal to which the fifth potential is applied;

a PWM control circuit which detects a voltage of the output terminal, and outputs a pulses signal having a pulse width determined based on the voltage of the output terminal;

a second driver circuit which drives the third to eighth switching elements based on the pulse signal; and a second pulse skipping detecting circuit which switches off the seventh and eighth switching elements, when detecting that the PWM control circuit has stopped outputting the pulse signal for a predetermined period or longer.

The DC-DC converter may have a second light load detecting circuit which switches off the seventh and eighth switching elements, when detecting that a current flowing in the second inductance element becomes equal to or smaller than a predetermined current value. In this case, the second pulse skipping detecting circuit may switch off the seventh and eighth switching elements before the second light load detecting circuit switches off the seventh and eighth switching elements.

The second pulse skipping detecting circuit detects a period during which outputting of the pulse signal is stopped, by, for example, counting a first clock which is synchronous with the pulse signal, or counting a second clock which is asynchronous with the pulse signal.

A control method of a DC-DC converter having a synchronous rectifying circuit according to a third aspect of the present invention comprises:

detecting an output voltage of the DC-DC converter, and generating a pulse signal having a pulse width determined based on the detected output voltage;

detecting an output stop period during which outputting of the pulse signal is stopped; and stopping operation of the synchronous rectifying circuit, when the output stop period of the pulse signal becomes equal to or longer than a predetermined period.

BRIEF DESCRIPTION OF THE DRAWINGS

These objects and other objects and advantages of the present invention will become more apparent upon reading of the following detailed description and the accompanying drawings in which:

FIG. 2A to FIG. 2J are timing charts for explaining the operation of the DC-DC converter shown in FIG. 1;

FIG. 4A to FIG. 4K are timing charts for explaining the operation of the DC-DC converter shown in FIG. 3;

DETAILED DESCRIPTION OF THE PREFERRED EMBODIMENTS

A power source circuit according to the embodiments of the present invention will be explained with reference to the drawings.

First Embodiment

Figure 1:
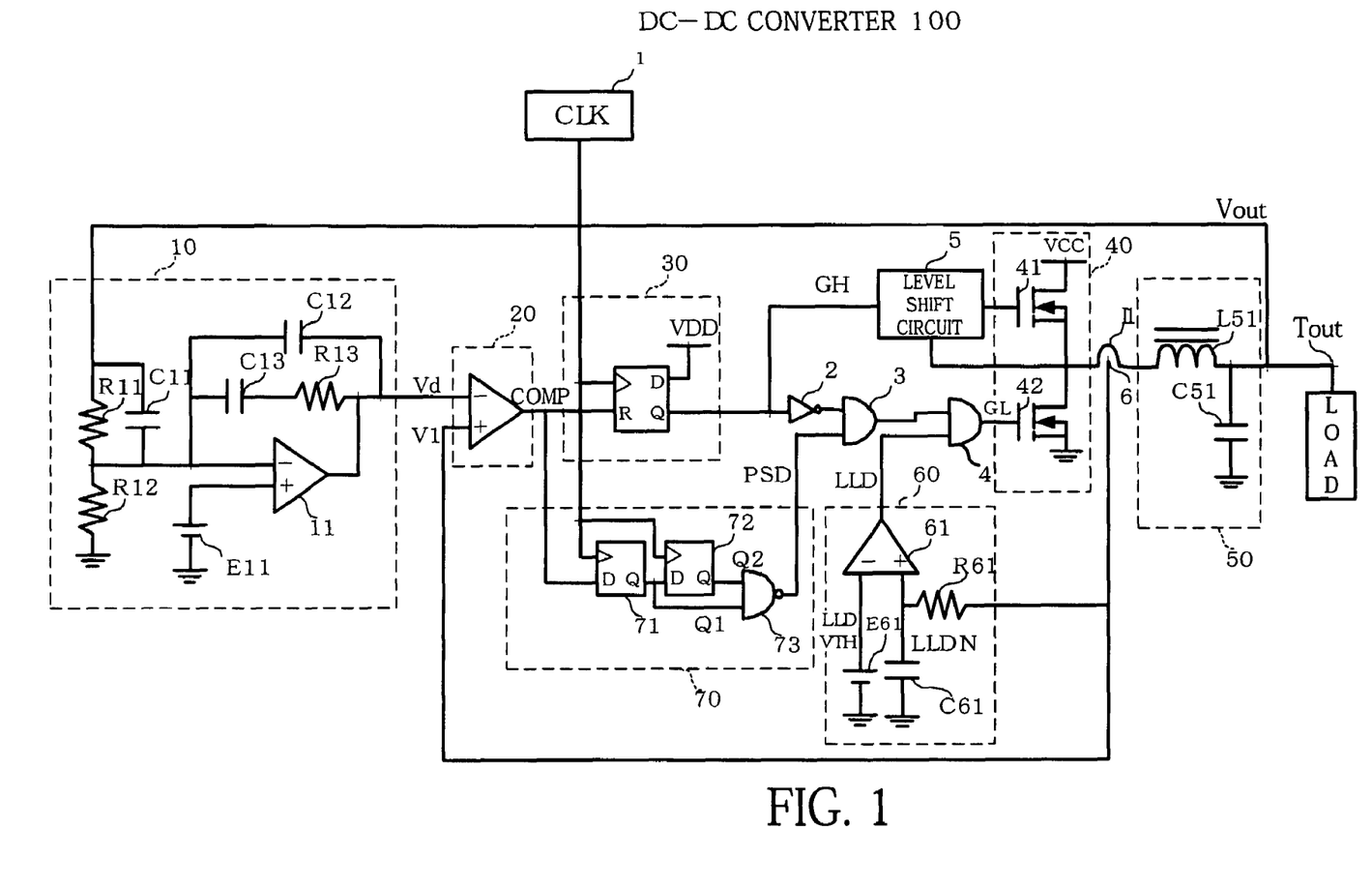
FIG. 1 is a circuit diagram of a DC-DC converter according to a first embodiment of the present invention.

As shown in FIG. 1, a DC (direct current)-DC (direct current) converter 100 according to the present embodiment comprises a control circuit 10, a comparator 20, a D type flip flop circuit 30 (hereinafter referred to as D-FF 30), a switching circuit 40, a smoothing circuit 50, a light load detecting circuit 60, a pulse skipping detecting circuit 70, a clock circuit 1, a NOT circuit 2, an AND circuit 3, an AND circuit 4, a level shift circuit 5, and a load current detecting circuit 6.

The control circuit 10 comprises voltage dividing circuits (resistors) R11 and R12, a high-pass capacitor C11, an integrating circuit including an error amplifier 11, a high-pass capacitor C12, a capacitor C13 for integration, and a resistor R13, and a reference power source E11.

The output terminal Tout of the DC-DC converter 100 is connected to one end of the resistor R11. The other end of the resistor R11 is connected to one end of the resistor R12. The other end of the resistor R12 is grounded. The high-pass capacitor C11 is connected between both the ends of the resistor R11. The connection node between the resistor R11 and the resistor R12 is connected to the inverting input terminal (−) of the error amplifier 11. The connection node between the resistor R11 and the resistor R12 is connected to one end of the high-pass capacitor C12. The connection node between the resistor R11 and the resistor R12 is further connected to one end of the capacitor C13 for integration. The positive voltage output terminal of the reference power source E11 is connected to the non-inverting input terminal (+) of the error amplifier 11. The negative voltage output terminal of the reference power source E11 is grounded. One end of the resistor R13 is connected to the other end of the capacitor C13. The output end of the error amplifier 11 is connected to the other end of the capacitor C12 and to the other end of the resistor R13. The output end of the error amplifier 11 is connected to the inverting input terminal (−) of the comparator 20.

A voltage (voltage signal) V1 corresponding to (for example, proportional to) a load current I1 is supplied to the non-inverting input terminal (+) of the comparator 20. A signal output from the comparator 20 is supplied to the reset terminal of the D-FF 30. The signal output from the comparator 20 is further supplied to the data terminal D of a D-FF 71 which constitutes the pulse skipping detecting circuit 70.

The D-FF 71, a D-FF 72, and a NAND circuit 73 detect that the comparator 20 has output a reset signal of high level for a two-clock period or longer. That is, the D-FF 71, the D-FF 72, and the NAND circuit 73 constitute a circuit for detecting that a PWM signal, which should be periodically output from the D-FF 30, has been omitted (skipped) continually for two pulses or more.

The Q terminal of the D-FF 71 is connected to the data terminal D of the D-FF 72. The Q terminal of the D-FF 71 is also connected to one input end of the NAND circuit 73. The Q terminal of the D-FF 72 is connected to the other input end of the NAND circuit 73.

The control circuit 10, the comparator 20, and the D-FF 30 constitute a PWM modulating circuit. In accordance with the output voltage Vout and the load current I1, the PWM modulating circuit generates a PWM (Pulse Width Modulated) signal for controlling the switching operation of the switching circuit 40 such that a stable output voltage can be obtained.

The clock output terminal of the clock circuit 1 is connected to the clock input terminal of the D-FF 30 and to the clock input terminals of the D-FF 71 and D-FF 72. A power source voltage VDD is applied to the data terminal D of the D-FF 30. The output end of the D-FF 30 is connected to the input end of the level shift circuit 5. Further, the output end of the D-FF 30 is connected to the input end of the NOT circuit 2. The output of the NOT circuit 2 is connected to the AND circuit 3. The output of the NAND circuit 73 is further connected to the AND circuit 3.

The output end of the level shift circuit 5 is connected to the gate of an N-MOSFET 41, which constitutes a switching element at the high side. The control end of the level shift circuit 5 is connected to the source of the N-MOSFET 41.

A power source voltage VCC is applied to the drain of the N-MOSFET 41. The source of the N-MOSFET 41 is connected, through an intermediate terminal (connection node), to the drain of an N-MOSFET 42, which constitutes a switching element at the low side. The source of the N-MOSFET 42 is grounded. The output end of the AND circuit 4 is connected to the gate of the N-MOSFET 42.

The output end of the switching circuit 40, i.e., the connection node (intermediate terminal) between the source of the N-MOSFET 41 and the drain of the N-MOSFET 42 is connected to one end of an inductor (choke coil) L51 in the smoothing circuit 50. The other end of the inductor L51 is connected to the output terminal Tout of the DC-DC converter 100. The other end of the inductor L51 is also connected to one end of a smoothing capacitor C51. The other end of the smoothing capacitor C51 is grounded. The output terminal Tout is connected to the load and also connected to one end of the resistor R11.

The load current detecting circuit 6 comprises a transformer, a hall element, etc. The load current detecting circuit 6 outputs a voltage (voltage signal) V1, which corresponds to (for example, is proportional to) the load current I1. The output end of the load current detecting circuit 6 is connected to the non-inverting input terminal (+) of the comparator 20. Further, the output end of the load current detecting circuit 6 is connected to one end of a resistor R61 in the light load detecting circuit 60. The other end of the resistor R61 is connected to the other end of a capacitor C61, whose one end is grounded. The output terminal of the load current detecting circuit 6 is connected to the non-inverting input terminal (+) of a comparator 61. The positive voltage output end of a reference power source E61 is connected to the inverting input terminal (−) of the comparator 61. The negative voltage output end of the reference power source E61 is grounded. The output of the comparator 61 is connected to the other input end of the AND circuit 4.

The operation of the DC-DC converter 100 having the above-described structure will be explained with reference to the timing charts of FIG. 2A to FIG. 2J.

In Case of a Heavy Load

The heavy load herein is such a heavy load as will require both the N-MOSFETs 41 and 42 constituting the switching circuit 40 to be switched.

Figure 2A:
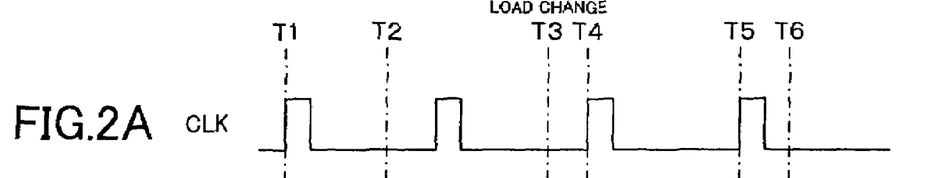
Figure 2B:
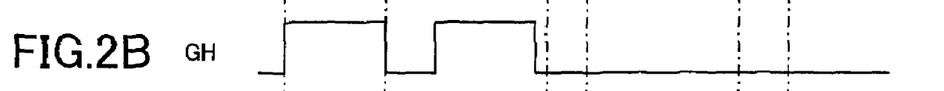
Figure 2C:
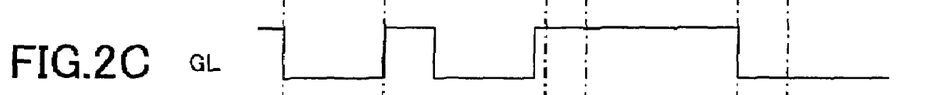
Figure 2D:
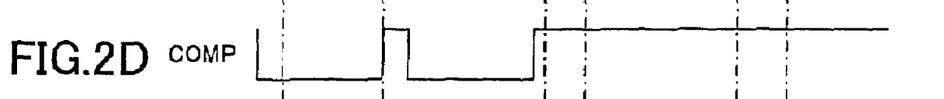

When the clock signal CLK shown in FIG. 2A, output from the clock circuit 1, rises at a timing T1, the D-FF 30 latches the power source voltage VDD. By the latching, the D-FF 30 outputs a high-side gate signal GH (a signal output from the Q terminal) of high level, as shown in FIG. 2B (at this time, a reset signal COMP from the comparator 20 is at low level, as shown in FIG. 2D). The level shift circuit 5 shifts (converts) the high level signal GH of the signaling system, which is from the D-FF 30, into a high level signal of the driving system. The level shift circuit 5 supplies the shifted signal to the gate of the N-MOSFET 41. In response to this, the N-MOSFET 41 at the high side is switched on.

Meanwhile, the gate signal GH from the D-FF 30 is inverted by the NOT circuit 2 to a low level signal. Thus, the AND circuit 3 closes its gate and outputs a low level signal. Also, the AND circuit 4 outputs a low-side gate signal GL of low level, as shown in FIG. 2C. Thus, the N-MOSFET 42 at the low side is switched off.

Accordingly, almost in synchronization with the rise of the clock signal CLK, the N-MOSFET 41 at the high side is switched on. Further, almost in synchronization with the rise of the clock signal CLK, the N-MOSFET 42 at the low side is switched off.

Figure 2E:
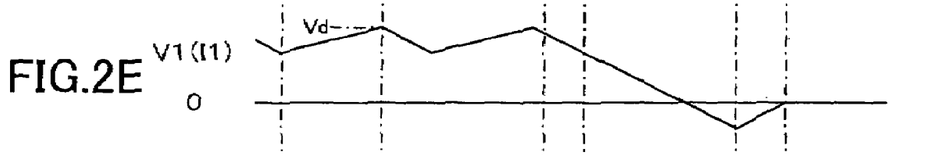

A current flows from the power source VCC to the inductor L51, through the N-MOSFET 41 at the high side, which is switched on, and the load current I1 starts to increase as shown in FIG. 2E. The load current detecting circuit 6 generates a voltage signal V1, which is almost proportional to the load current I1. The load current detecting circuit 6 supplies the voltage signal V1 to the non-inverting input terminal of the comparator 20.

In the meantime, in a state that the load is stable, the control circuit 10 outputs a relatively stable difference voltage Vd. The difference voltage Vd supplied to the inverting input terminal of the comparator 20 is relatively stable. When the voltage signal V1, which corresponds to the load current I1, increases to be larger than the difference voltage Vd, the comparator 20 outputs a reset signal COMP of high level, as shown in FIG. 2D. The timing of this output is T2.

In response to this high level reset signal COMP, the D-FF 30 is reset and a high-side gate signal GH of low level (OFF level) is applied to the gate of the N-MOSFET 41 at the high side, as shown in FIG. 2B. And a low-side gate signal GL of high level (ON level) is applied to the gate of the N-MOSFET 42 at the low side, as shown in FIG. 2C.

Because of this, the N-MOSFET 41 at the high side is switched off, and the N-MOSFET 42 at the low side is switched on. As shown in FIG. 2E, the inductor L51 continues flowing the load current I1 to the load through the N-MOSFET 42 that is switched on, by the electromagnetic energy stored therein. The load current I1 gradually decreases as the time passes. Then, at the timing at which the voltage signal V1 becomes smaller than the difference voltage Vd, the reset signal COMP output from the comparator 20 becomes low level.

Thereafter, each time the clock signal CLK rises, the above-described operation is repeated.

Figure 2F:
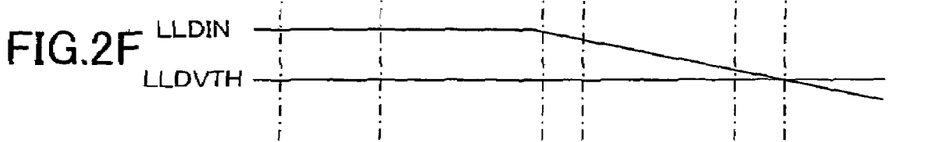
Figures 2G, 2H:
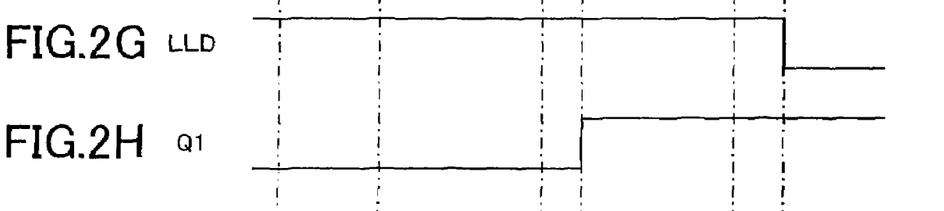

In the case where the load is relatively large, the load current I1 is also large to some extent and the voltage signal V1 is also relatively large. Therefore, as shown in FIG. 2F, a state that an input LLDIN supplied to the non-inverting input end of the comparator 61 is larger than the reference voltage LLDVTH supplied from the reference power source E11 continues. Therefore, the output signal LLD from the comparator 61 is stably maintained at high level, as shown in FIG. 2G. Accordingly, a high level signal is applied to one input end of the AND circuit 4 to thereby keep the gate of the AND circuit 4 open. In this case, the output from the NOT circuit 2 is supplied, without being changed, to the N-MOSFET 42 at the low side.

Figure 2I:
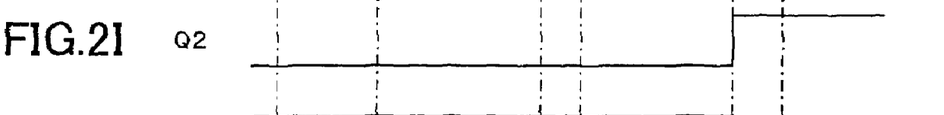
Figure 2J:
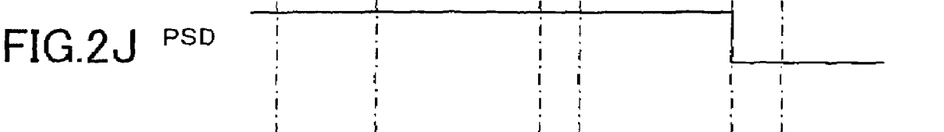

Further, the output from the comparator 20 is stably at low level at the timings at which the clock signal CLK rises as shown in FIGS. 2A and 2D, and the D-FF 71 and the D-FF 72 continuously store and output low level signals as shown in FIGS. 2H and 2I. The signal Q1 and the signal Q2 input to the NAND circuit 73 are both at low level. The NAND circuit 73 outputs a signal PSD of high level, as shown in FIG. 2J. Therefore, a high level signal is supplied to one input end of the AND circuit 30 to keep the gate of the AND circuit 3 open. Therefore, the output from the NOT circuit 2 is supplied, without being changed, to one input end of the AND circuit 3. Accordingly, it is the voltage level of the signal output from the Q terminal of the D-FF 30 that controls the switching on/off of the N-MOSFET 42 at the low side.

In this way, in the heavy load state, the switching circuit 40 performs the switching operation in accordance with the PWM signal output from the D-FF 30.

In Case of a Load Being Stably Light

In a case where the load is light and stable in this state, the load current is smaller than it is when the load is heavy. Therefore, the charging voltage LLDIN of the capacitor C61 becomes smaller than the voltage LLDVTH of the reference power source E61 of the comparator 61. The comparator 61 outputs a low level signal. Thus, the AND circuit 4 is closed and a low level signal is constantly supplied to the gate of the N-MOSFET 42. Accordingly, the N-MOSFET 42 is kept switched off and only the N-MOSFET 41 at the high side performs the switching operation. As a result, the load current decreases and the synchronous rectification is stopped.

In this way, in the light load state, the N-MOSFET 42 at the low side, which constitutes the switching circuit 40, is constantly switched off. In the light load state, only the N-MOSFET 41 at the high side performs the switching operation in accordance with the PWM signal output from the D-FF 30.

In a Case where the Load is Changed from a Heavy Load State to a Light Load State For example, assume that the load suddenly decreases at the timing T3 shown in FIG. 2.

Due to the sudden decrease of the load, the output voltage Vout increases and the difference voltage Vd output from the error amplifier 11 decreases. Meanwhile, since the switching operation of the N-MOSFET 41 at the high side stops, the load current I1 decreases and the voltage signal V1 also decreases. Because of this, the comparator 20 continuously outputs a reset signal COMP of high level, as shown in FIG. 2D. The D-FF 30 is reset by this high level reset signal COMP, and its Q output becomes low level. In accordance with this signal, a high-side gate signal GH of low level is applied to the gate of the N-MOSFET 41 at the high side, as shown in FIG. 2B. On the other hand, a low-side gate signal GL of high level is applied to the gate of the N-MOSFET 42 at the low side, as shown in FIG. 2C. This low-side gate signal GL of high level switches on the N-MOSFET 42 at the low side.

Because the N-MOSFET 42 at the low side is switched on, the load current I1 keeps flowing into the inductor L51. Since the load has become light, most of the load current I1 becomes the charging current of the smoothing capacitor C51. Thus, the charging voltage of the smoothing capacitor C51 increases. When the voltage at a side of the inductor L51 closer to the load becomes higher than that at a side of the inductor L51 closer to the switching circuit 40 due to the increase of the charging voltage of the smoothing capacitor C51, the current begins to flow in the reverse direction, as shown in FIG. 2E. When the current in the reverse direction (backward current) gradually increases, it will give a large stress on the N-MOSFET 42.

In the meantime, after the comparator 20 outputs the high level signal, the clock signal CLK rises at the timing T4. In this case, unlike usually, the D-FF 71 stores the reset signal COMP of high level shown in FIG. 2D, output from the comparator 20, as shown in FIG. 2H.

Further, when the clock signal CLK rises at the timing T5, the D-FF 71 stores the reset signal COMP of high level output from the comparator 20. Then, the D-FF 72 latches the signal Q1 of high level, which is the output from the D-FF 71.

Therefore, as shown in FIGS. 2H and 2I, the signal Q1 output from the D-FF 71 and the signal Q2 output from the D-FF 72 both become high level. As a result, the output signal PSD from the NAND circuit 73 becomes low level. Thus, the AND circuit 3 is closed and the output from the AND circuit 3 changes from high level to low level.

Due to the change to low level of the output from the AND circuit 3, the low-side gate signal GL or the output signal from the AND circuit 4 becomes low level. Thus, the N-MOSFET 42 at the low side is switched off, and the load current I1 ceases to flow as shown in FIG. 2E.

That is, when the reset signal COMP output from the comparator 20 is kept at high level for a period corresponding to two clocks or longer, the D-FF 30 continues to be reset. Therefore, such a state occurs that pulses whose pulse width has been modulated are not output continuously to amount to omission of two pulses or more. When there is omission of two or more continuous pulses, the pulse skipping detecting circuit 70 detects this omission and outputs a signal PSD of low level. Due to the signal PSD of low level, the N-MOSFET 42 at the low side is switched off. Accordingly, without the pulse skipping detecting circuit 70, a current flows from the smoothing capacitor C51 to the N-MOSFET 41 at the low side through the inductor L51 in a case where the state that the N-MOSFET 41 at the high side is switched off and the N-MOSFET 42 at the low side is switched on continues for a two-clock signal or longer. However, with the pulse skipping detecting circuit 70, since the N-MOSFET 42 at the low side is switched off, a situation in which the N-MOSFET 42 at the low side is destroyed is prevented.

Second Embodiment

According to the first embodiment, the pulse skipping detecting circuit 70 is structured to operate in accordance with the same clock signal as the clock signal CLK supplied to the D-FF 30 (structured to operate synchronously). However, the pulse skipping detecting circuit 70 needs at least to be able to detect that the D-FF 30 maintains a low level signal without outputting the pulse signal, which should originally be output, for some time or longer (or that the D-FF 30 continues to be reset). In other words, the making of the pulse skipping circuit 70 is arbitrary, as long as it can directly or indirectly measure the period during which the outputting of the pulse signal is stopped.

Figure 3:
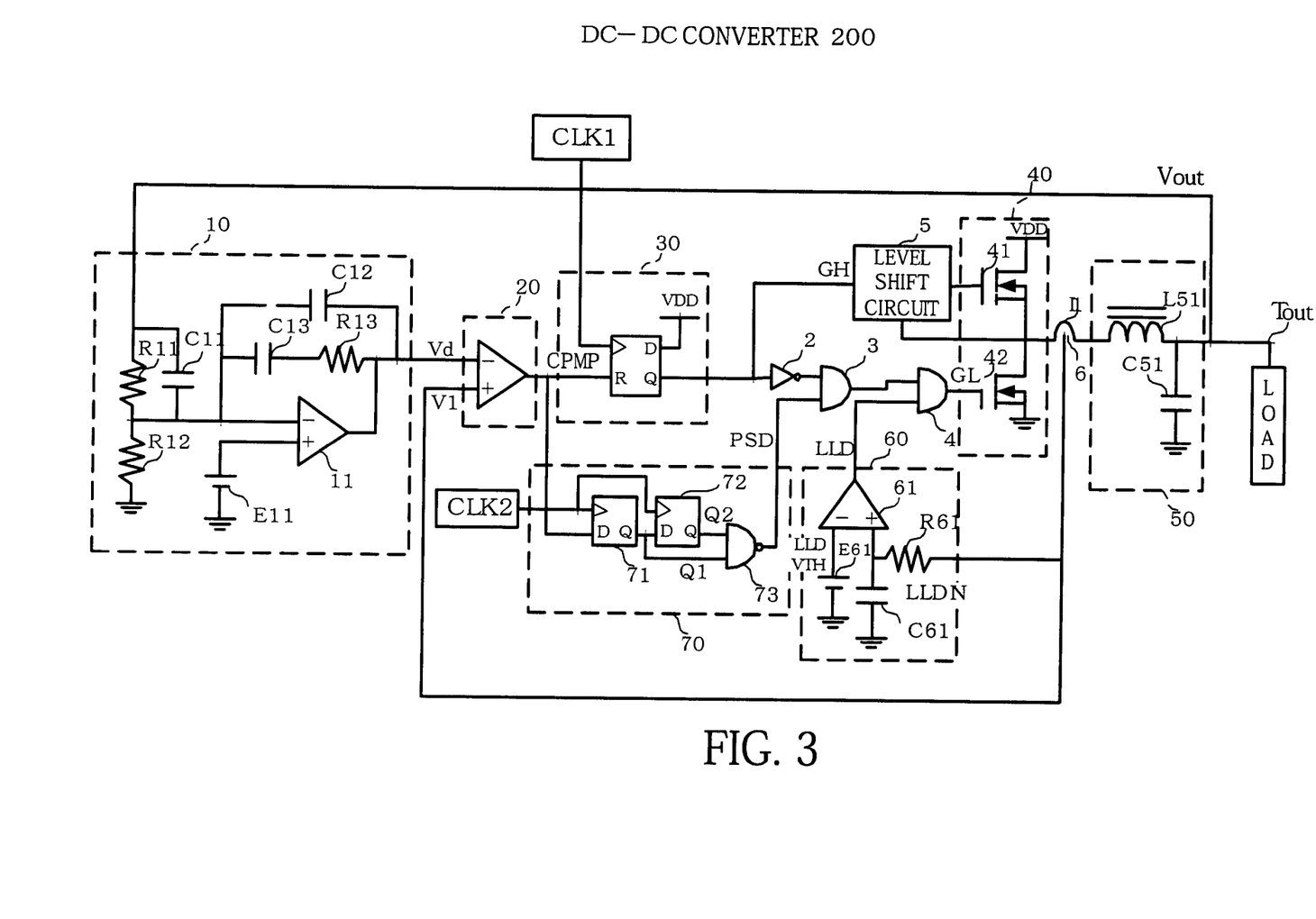
FIG. 3 is a circuit diagram of a DC-DC converter according to a second embodiment of the present invention.
Figure 4A:
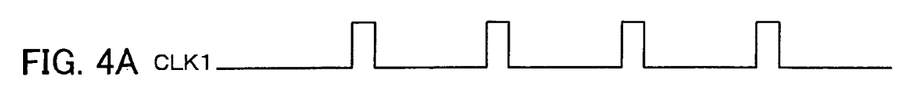
Figure 4B:
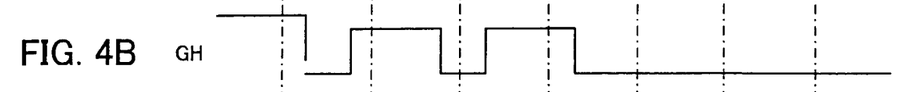
Figure 4C:
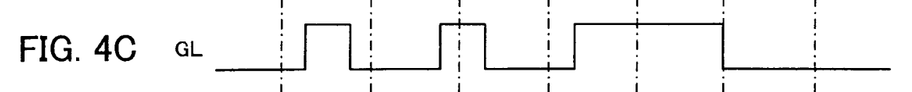
Figure 4D:
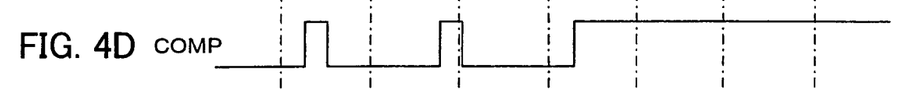
Figure 4E:
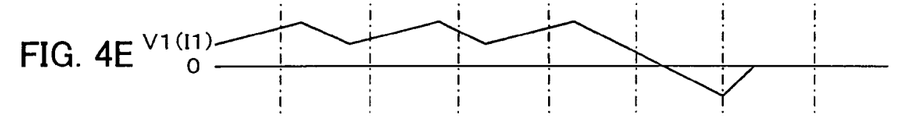
Figure 4F:
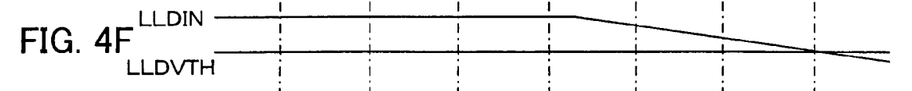
Figure 4G:
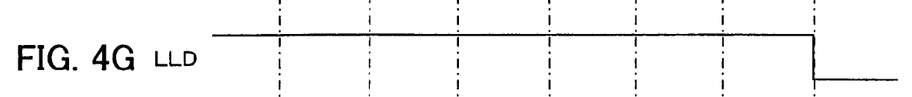
Figure 4H:
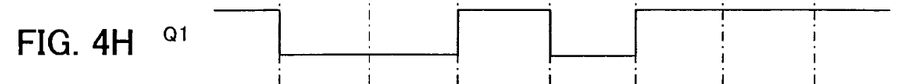
Figure 4I:
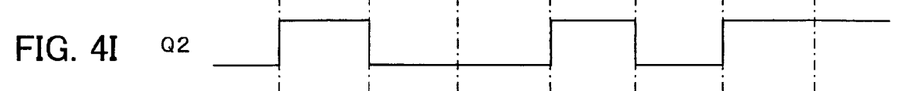
Figure 4J:
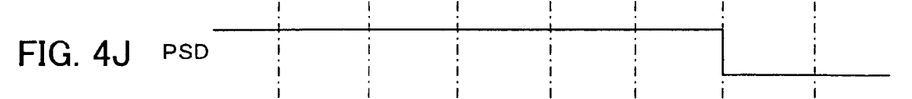
Figure 4K:
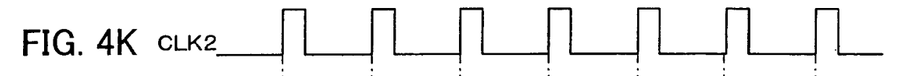

For example, FIG. 3 shows an example of a DC-DC converter 200, which comprises a D-FF 71, a D-FF 72, and a pulse skipping detecting circuit 70 which operate in synchronization with a clock signal CLK2 independent from the clock signal CLK1 controlling the D-FF 30.

With this structure, in a case where the output from the comparator 20 is continually at high level during the period in which the clock signal CLK2 is output for two clocks, the output from the NAND circuit 73 becomes low level. As a result, the output from the N-MOSFET circuit 42 is switched off. As obvious, even with the structure of FIG. 3, it is possible to switch off the N-MOSFET 42 at the low side, upon detecting changes of the load.

The operation timing charts of the DC-DC converter 200 shown in FIG. 3 are shown in FIG. 4A to FIG. 4J. The timing charts of FIG. 4A to FIG. 4J are the same as the timing charts according to the first embodiment shown in FIG. 2A to FIG. 2J, except that the D-FF 71 and the D-FF 72 operate in synchronization with the clock signal CLK2.

Figure 5:
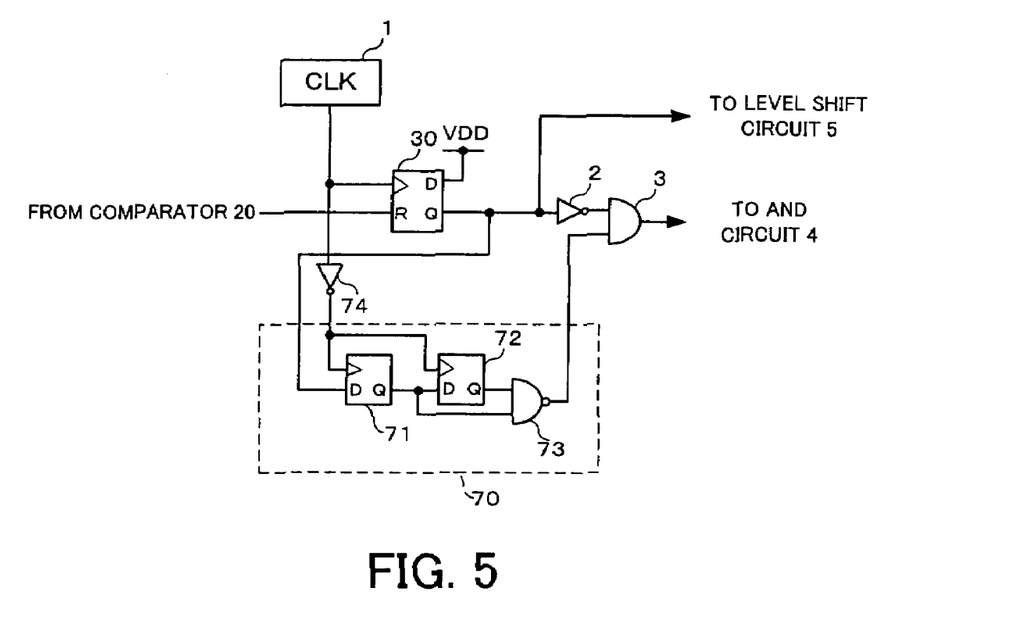
FIG. 5 is a diagram showing another example of the structure of a pulse skipping detecting circuit.

FIG. 5 shows an example that the input signal to the D-FF 71 constituting the pulse skipping detecting circuit 70 is the output signal from the D-FF 30. In the circuit shown in FIG. 5, the input signal to the D-FF 72 is the output signal from the D-FF 71. Further, the circuit shown in FIG. 5 comprises a NOT circuit 74. The input signal to the NOT circuit 74 is the output signal from the clock circuit 1. The input signal to the clock input terminals of the D-FF 71 and D-FF 72 is the output signal from the NOT circuit 74. The circuits shown in FIG. 1 and FIG. 3 measure the period during which no pulses are output from the D-FF 30, by measuring the period during which the D-FF 30 is reset. However, with the structure of FIG. 5, the pulse skipping detecting circuit 70 directly measures the period during which no pulses are output from the D-FF 30. Then, when the pulse skipping detecting circuit 70 detects the absence of the output, which lasts for a certain period (a two-clock period), it closes the AND circuit 3.

Figure 6:
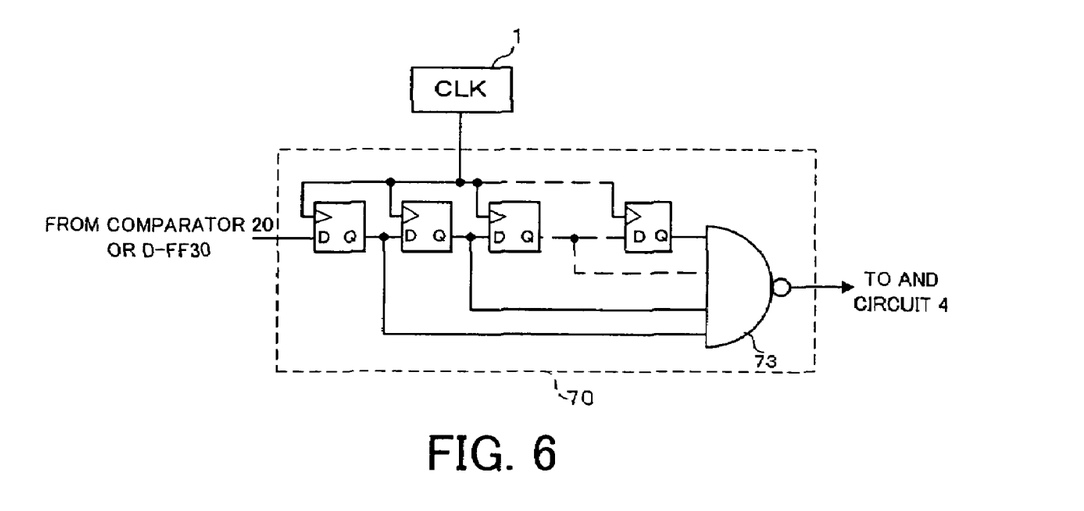
FIG. 6 is a diagram showing another example of the structure of the pulse skipping detecting circuit.

FIG. 6 shows an example that the pulse skipping detecting circuit 70 is constituted by m stages of D-FFs. With this structure, the pulse skipping detecting circuit 70 outputs a signal for switching off the switching element at the low side, when pulses are not output for an m-clock period continually.

Figure 7:
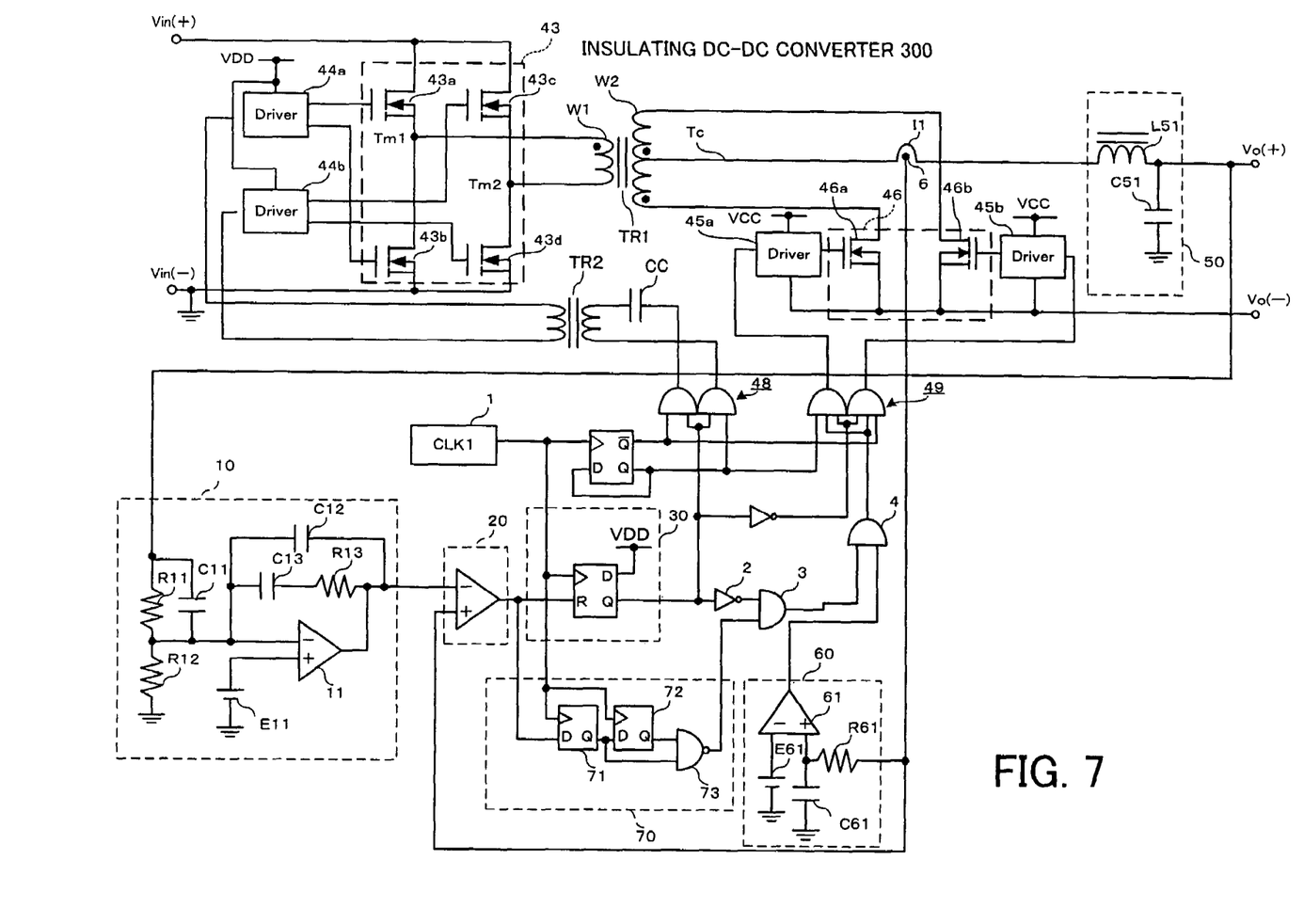
FIG. 7 is a circuit diagram of an insulating DC-DC converter.

The present invention can also be applied to an insulating DC-DC converter 300 as shown in FIG. 7.

This DC-DC converter 300 switches a bridge circuit 43 comprising four N-MOSFETs 43a to 43d, which are bridge-connected through intermediate terminals Tm1 and Tm2, by means of two driver circuits 44a and 44b. By this switching, the DC-DC converter 300 supplies {an input voltage Vin (+)—an input voltage Vin (−)} to a primary winding W1 of an insulating transformer TR1. The DC-DC converter 300 has the center tap of a secondary winding W2 connected to a smoothing circuit 50. The DC-DC converter 300 rectifies the input voltage by switching N-MOSFETs 46a and 46b by means of driver circuits 45a and 45b. The DC-DC converter 300 supplies the rectified input voltage to the smoothing circuit 50.

Based on the output voltage Vout from the smoothing circuit 50 and a load current I1 supplied to the smoothing circuit 50, a control circuit 10, a comparator 20, and a D-FF 30 generate a PWM signal. The generated PWM signal is supplied to the driver circuits 44a and 44b through a logical circuit 48, an insulating transformer TR2, and a DC component cutting capacitor CC. The PWM signal is further supplied to the driver circuits 45a and 45b through a logical circuit 49.

When detecting a light load, a light load detecting circuit 60 supplies a low level signal to the logical circuit 49 through an AND circuit 4. By supplying this low level signal, the light load detecting circuit 60 closes an AND circuit, which constitutes the logical circuit 49. Then, the light load detecting circuit 60 instructs the driver circuits 45a and 45b at the secondary side to switch off the N-MOSFETs 46a and 46b, which are the synchronous rectifying switching elements.

In a case where the comparator 20 outputs a high level signal continuously for two-clock period or longer, a pulse skipping detecting circuit 70 supplies a low level signal to the driver circuits 45a and 45b through the AND circuit 4 and the logical circuit 49. By supplying the low level signal, the pulse skipping detecting circuit 70 switches off the synchronous rectifying N-MOSFETs 46a and 46b, which constitute a switching circuit 46 at the secondary side.

With this structure too, continuous omission (skipping) of the PWM signal, which might occur when a heavy load is changed to a light load, can be detected. When any skipping is detected, the pulse skipping detecting circuit 70 switches off the synchronous rectifying switching elements 46a and 46b. By doing so, the pulse skipping detecting circuit 70 can prevent the back flow of the current from the smoothing capacitor C51 to the synchronous rectifying switching elements 46a and 46b through the inductor L51.

The structures of the pulse skipping detecting circuit 70 shown in FIG. 3, FIG. 5, and FIG. 6 can also be applied to the insulating DC-DC converter 300 shown in FIG. 7.

According to the above-described embodiments, the switching circuit 40, the components 43a to 43d, and the components 44a and 44b are constituted by an N-MOSFET. This is not the only case, but they may be constituted by a P-MOSFET or other types of switching element.

Further, the power source voltages VCC and VDD may not necessarily be a power source voltage supplied from the outside, but a voltage internally stepped down or stepped up. That is, the power source voltages VCC and VDD are a general voltage, which serves as the reference of operations. Likewise regarding the grounding voltage, an arbitrary voltage such as the grounding voltage of a chip, the grounding voltage of a substrate, the grounding voltage of a chassis, etc., which will serve as the reference of operations of a circuit, may be set as the grounding voltage. As concerns terminals, nodes, and the like, no physical "terminals" need to be present, but the site at which a wire and another wire are connected or at which a wire and another wire cross may be such terminals. Furthermore, the numerical values shown in the above-described embodiments may arbitrarily be changed.

The above-described examples of circuits are mere examples, thus their structure can arbitrarily be changed as long as the same functions can be realized.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-310868 filed on Oct. 26, 2005 and including specification, claims, drawings and summary. The disclosure of the above Japanese Patent Application is incorporated herein by reference in its entirety.

What is claimed is:

1. A DC-DC converter, comprising:
a third switching element connected between a terminal to which a third potential is applied and a second intermediate terminal;
a fourth switching element connected between said second intermediate terminal and a terminal to which a fourth potential is applied;
a fifth switching element connected between said terminal to which the third potential is applied and a third intermediate terminal;
a sixth switching element connected between said third intermediate terminal and said terminal to which the fourth potential is applied;
a transformer having a primary winding whose terminals are connected to said second intermediate terminal and said third intermediate terminal respectively;
a seventh switching element connected between a first terminal of a secondary winding of said transformer and a terminal to which a fifth potential is applied;
an eighth switching element connected between a second terminal of said secondary winding of said transformer and said terminal to which the fifth potential is applied;
a second inductance element connected between a tap of said secondary winding of said transformer and an output terminal;
a second capacitor connected between said output terminal and said terminal to which the fifth potential is applied;
a PWM control circuit which detects a voltage of said output terminal, and outputs a pulses signal having a pulse width determined based on the voltage of said output terminal;
a second driver circuit which drives said third to eighth switching elements based on the pulse signal;
a second pulse skipping detecting circuit which switches off said seventh and eighth switching elements, when detecting that said PWM control circuit has stopped outputting the pulse signal for a predetermined period or longer; and a second light load detecting circuit which switches off said seventh and eighth switching elements, when detecting that a current flowing in said second inductance element becomes equal to or smaller than a predetermined current value, wherein before said second light load detecting circuit switches off said seventh and eighth switching elements, said second pulse skipping detecting circuit switches off said seventh and eighth switching elements.

2. A DC-DC converter, comprising a third switching element connected between a terminal to which a third potential is applied and a second intermediate terminal;

a fourth switching element connected between said second intermediate terminal and a terminal to which a fourth potential is applied;

a fifth switching element connected between said terminal to which the third potential is applied and a third intermediate terminal;

a sixth switching element connected between said third intermediate terminal and said terminal to which the fourth potential is applied;

a transformer having a primary winding whose terminals are connected to said second intermediate terminal and said third intermediate terminal respectively;

a seventh switching element connected between a first terminal of a secondary winding of said transformer and a terminal to which a fifth potential is applied;

an eighth switching element connected between a second terminal of said secondary winding of said transformer and said terminal to which the fifth potential is applied;

a second inductance element connected between a tap of said secondary winding of said transformer and an output terminal;

a second capacitor connected between said output terminal and said terminal to which the fifth potential is applied;

a PWM control circuit which detects a voltage of said output terminal, and outputs a pulses signal having a pulse width determined based on the voltage of said output terminal;

a second driver circuit which drives said third to eighth switching elements based on the pulse signal; and a second pulse skipping detecting circuit which switches off said seventh and eighth switching elements, when detecting that said PWM control circuit has stopped outputting the pulse signal for a predetermined period or longer;

wherein said second pulse skipping detecting circuit detects a period during which outputting of the pulse signal is stopped, by counting a first clock which is synchronous with the pulse signal.

3. A DC-DC converter, comprising a third switching element connected between a terminal to which a third potential is applied and a second intermediate terminal;

a fourth switching element connected between said second intermediate terminal and a terminal to which a fourth potential is applied;

a fifth switching element connected between said terminal to which the third potential is applied and a third intermediate terminal;

a sixth switching element connected between said third intermediate terminal and said terminal to which the fourth potential is applied;

a transformer having a primary winding whose terminals are connected to said second intermediate terminal and said third intermediate terminal respectively;

a seventh switching element connected between a first terminal of a secondary winding of said transformer and a terminal to which a fifth potential is applied;

an eighth switching element connected between a second terminal of said secondary winding of said transformer and said terminal to which the fifth potential is applied;

a second inductance element connected between a tap of said secondary winding of said transformer and an output terminal;

a second capacitor connected between said output terminal and said terminal to which the fifth potential is applied;

a PWM control circuit which detects a voltage of said output terminal, and outputs a pulses signal having a pulse width determined based on the voltage of said output terminal;

a second driver circuit which drives said third to eighth switching elements based on the pulse signal; and a second pulse skipping detecting circuit which switches off said seventh and eighth switching elements, when detecting that said PWM control circuit has stopped outputting the pulse signal for a predetermined period or longer;

wherein said second pulse skipping detecting circuit detects a period during which outputting of the pulse signal is stopped, by counting a second clock which is asynchronous with the pulse signal.

* * * * *

UNITED STATES PATENT AND TRADEMARK OFFICE
CERTIFICATE OF CORRECTION

PATENT NO. : 7,660,134 B2
APPLICATION NO. : 11/586861
DATED : February 9, 2010
INVENTOR(S) : Imai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Thirtieth Day of November, 2010

David J. Kappos
*Director of the United States Patent and Trademark Office*